US007134824B2

(12) United States Patent
Peñalver Garcia

(10) Patent No.: US 7,134,824 B2
(45) Date of Patent: Nov. 14, 2006

(54) CURLING-SEALING COMPOUND LINING MACHINE FOR NON-CIRCULAR METAL LIDS OF CONTAINERS

(75) Inventor: Jose Peñalver Garcia, Molina de Segura (ES)

(73) Assignee: Industrias Peñalver S.L., Molina de Segura (ES)

( * ) Notice: Subject to any disclaimer, the term of this patent is extended or adjusted under 35 U.S.C. 154(b) by 211 days.

(21) Appl. No.: 10/493,342

(22) PCT Filed: Jun. 5, 2002

(86) PCT No.: PCT/ES02/00271

§ 371 (c)(1), (2), (4) Date: Apr. 22, 2004

(87) PCT Pub. No.: WO03/103873

PCT Pub. Date: Dec. 18, 2003

(65) Prior Publication Data

US 2005/0000417 A1 Jan. 6, 2005

(51) Int. Cl.
*B21D 51/46* (2006.01)
*B23P 21/00* (2006.01)
*B23P 19/00* (2006.01)
*B05B 13/02* (2006.01)
*B05D 5/00* (2006.01)

(52) U.S. Cl. ............................. 413/61; 413/56; 413/7; 29/785; 29/792; 118/319; 427/284

(58) Field of Classification Search ................. 29/801, 29/509, 525.13, 458, 773, 783, 791, 515, 29/785, 792; 118/319, 317, 318, 306, DIG. 10, 118/323; 413/2, 6, 7, 32, 56, 61; 72/379.4; 427/284

See application file for complete search history.

(56) References Cited

U.S. PATENT DOCUMENTS 4,262,629 A * 4/1981 McConnellogue et al. .. 118/668
5,564,877 A * 10/1996 Hamilton ..................... 413/61
5,997,648 A 12/1999 Haar
6,113,333 A * 9/2000 Rutledge et al. .............. 413/19
6,547,878 B1 * 4/2003 Rutledge et al. .............. 118/52
6,730,168 B1 * 5/2004 Ross .......................... 118/319

FOREIGN PATENT DOCUMENTS

ES 2 066 679 3/1995
ES 2 082 327 3/1996
ES 2 148 176 10/2000

* cited by examiner

*Primary Examiner*—David P. Bryant
*Assistant Examiner*—Douglas E. Mazzuca, Jr.
(74) *Attorney, Agent, or Firm*—Collard & Roe, P.C.

(57) ABSTRACT

The machine (4) operates continuously and is a single unit having a prismatic construction and a body with an upper base that incorporates a large rotary platen (1), a number of workstations (5) that are placed in said platen and are provided with diametrically opposite curling and sealing compound lining devices (6) and (7), one or more sets of feeding (8) and discharge (9) devices and common actuation means for these stations (5), internal to the machine (4), which machine may operate with any lids (2) or bases of any profile, adapting to any shape of these by rotating the lids (2) in the workstations (5).

18 Claims, 8 Drawing Sheets

C-C'

B-B'

CURLING-SEALING COMPOUND LINING MACHINE FOR NON-CIRCULAR METAL LIDS OF CONTAINERS

CROSS REFERENCE TO RELATED APPLICATIONS

Applicant claims priority under 35 U.S.C. §365 of PCT/ES02/00271 filed on JUN. 5, 2002. The international application under PCT article 21(2) was not published in English.

OBJECT OF THE INVENTION

The present invention relates to a curling-sealing compound lining machine for non-circular metal lids of containers, from among the various machines intended for this type of construction of said container components, whether these are bases or lids of any non-circular shape, in rectangular, oval, square, triangular and other configurations.

This invention is characterised by a special construction of the machine that allows a simultaneous curling and sealing compound lining of the lid, improving its finish, increasing production and facilitating access of the lids to the sealing compound-drying oven, all of this by a rotary construction of the machine, with several consecutive, complementary working positions for the curling devices and the sealing compound lining devices, that are movable and opposite each other in every position.

For this purpose, it is provided with a new and simpler construction of the curling device, with an inclined gun focussing the sealing compound stream to the inside of the lid edge, which is made possible by an improved finish of the curling that later will also facilitate the final closure of the container.

Feeding is performed continuously, that is, without any stoppages of the main platen, as well as improving the deposition of the lid, which is carried out in the core gradually and without errors.

The discharge is also continuous and synchronised, by simultaneously providing two different speeds for the lid-conveying means.

Finally, the machine allows a simple exchange of the lid-carrying plates, the copying cam, when the implementation is by a mechanical cam, while when using an electronic cam it is enough to reprogram the servomotor set, naturally replacing the down-stacker with another suitable for the new configuration, all of this enabling a simple adaptation to any lid shape.

BACKGROUND OF THE INVENTION

The earliest known antecedents for curlers of non-circular lids are those employing a press, with the disadvantage of the low production speed and the foreseeable imperfect finish resulting when the container is closed due to the need to allow exit of the lid core.

Later were implemented roller curlers, which generally used two complementary curling rollers with an incomplete finishing that resulted in a complicated closure of the container. These curling defects also cause a sealing compound fillet in a critical position, as the sealing compound wets the corners more than would be desirable.

Regarding sealing compound lining machines, tampon systems are known that use a sealing compound arc with a capacity on the order of 100 lids/min. that cannot provide sealing compound to the lid flange. Equally imperfect is sealing compound showering, also using a non-revolving method, in which a mask leaves open a projection of a multiplicity of small sealing compound droplets that together form a set of aligned points that replaces the sealing compound band, naturally also used for central application of sealing compound and not under the lid curl, although it is three times faster than the immediately preceding system.

Sealing compound lining machines with a discontinuous feed using belts with an indexed (start and stop) motion, with discontinuous lid feeding, have a seriously limited speed even in the only known case where the feed and discharge lines are duplicated as well as duplicating the feed of each one, and struggle to reach 400 lids/min.

In this unique machine a lid is deposited during the stop of the belt and another during its motion, with these lids being sent to corresponding sealing compound lining stations. In these stations and during the stops of the conveyor belt the lid rotates about its axis and the sealing compound, provided with servomechanisms that can only make it rotate about its vertical axis, applies the sealing compound in different angles of inclination resulting in a sealing compound lining band that does not maintain its distance from the lid edge, despite the cost of installing the electronic control servomechanisms for the guns; in addition, the type of lid to which the sealing compound lining is applied cannot be changed as it can only be positioned by gravity, the lids are not discharged with accurate regularity, and the machine cannot operate with any conventional drying oven, nor with two independent ovens or with an oven having two scoop towers.

As regards the lid-feeding device, in the cases described heretofore, with the exception of the aforementioned double feeding system, this is performed with the belt or the rotary base stopped, and under gravity.

One known system involves a lid held in a lower, displaceable base provided with an orifice to allow the lid to fall, together with jack-knife clips that hold the pile of remaining lids placed on top of the lowermost one, until the platform returns and the clips let the lids fall on the unperforated area of said platform.

Another better-known system is the worm gear, with generally two opposite ones used that feed each lid to a lower platen provided with satellite platens in charge of feeding the lid tangentially and with the lid support stopped.

Finally, regarding discharge devices for curing or sealing compound lining machines, the initial system involved parallel tilt bars that guided the lid and released it after raising it.

This has subsequently been changed by a faster but less efficient system that is effected in an unsynchronised manner, as the lid slides when there is dust on the belt or due to the natural asynchrony from constant use or machine vibrations.

The applicant is not aware of any curling-sealing compound lining machine for non-circular container lids that has the simplicity, speed and is as free of errors and failures in the handling of lids as the one described hereunder.

DESCRIPTION OF THE INVENTION

The present invention relates to a curling—sealing compound lining machine for non-circular container lids from among the various machines intended for this type of construction of the said components of containers, whether they are bases or lids of any non-circular shape.

It is important to perform the lid curling and sealing simultaneously due to the time gained in the process and the reduced energy consumption and manufacturing space, as well as the reduced costs, and further making unnecessary the intermediate storage between the stages of the process. On top of this there is the added advantage of perfected finish of the lid, eliminating rejections, as the finish of the lid edge is improved; furthermore, the contained closure is therefore improved thereby increasing the production of packaged products. The ordered and synchronised access of the lids to the sealing compound-drying oven is also facilitated.

All of this is achieved by a machine comprised of a single unit, with a prismatic construction and a body provided with common driving means, as well as an upper base having a rotary platen, that performs both the curling and sealing compound lining operations simultaneously at a high speed, rotating the lid and attaining productions of 800 lids/min.

The platen has a number of different working positions or stations that are equidistant and have a complementary consecutive action, both for the curling and the sealing compound lining devices. Both types of device are set opposite each other in each workstation, and are movable such that along a theoretical arc of almost 90° that matches the closest position of said curling and sealing compound lining devices, both the curling and sealing compound lining means are distanced from their usual working positions.

Along said theoretical arc of almost 90°, in which the run of the lids in the machine starts and finishes, the lid does not rotate about its axis; however, if the number of stations were changed if the machine were gradually increased or reduced in size or if the distance between said workstations were changed, it may be that the lid would rotate a fraction of a revolution in the first station, in the last or in both.

The three remaining theoretical 90° arcs are used for performing at most three full revolutions of the lid, so that all are used for curling and only two at most for sealing compound lining, remarking that during sealing compound lining a slight sealing compound overlapping is recommendable between the sealing compound lining end point of the first revolution and the sealing compound lining end point of the process, which leads to a slight increase in the run of the gun.

Notwithstanding the above, the possibility is not ruled out of performing the curling in two stages, and even of performing the sealing compound lining in a single theoretical arc of 90° with the aforementioned consideration of having an overlap between the initial and final ends of the sealing compound band in the case of two sealing compound lining revolutions.

This difference of action of the two devices implies a separation between the curling and sealing compound lining operations to serve as a cushion between the initial and final parts of this theoretical case, i.e. between the central, preferably sealing compound lining, arc of somewhat more than 180° when including the sealing compound overlap, and the maximum revolutions curling arc of about 270°, equivalent to three curling revolutions, with the last revolution preferably used for fine adjustment of the lid edge.

In the remaining theoretical 90° the lid-carrying platen does not turn about its axis to facilitate feeding and discharge of the lid; it is possible to reduce said theoretical or to increase the number of devices for discharge or feeding.

The construction of the sealing compound lining device allows a completely accurate inclination of the gun in any desired angle on the plane internally tangent to the edge of the lid flange, so that the width of the sealing compound stream allows to focus it not only on the inside face of the lid but also on the inner segment of the flange rounding, and by centrifugal force to a considerable extent of the flange, this being a clear advantage over the gun balancing system that in an extreme position brings the sealing compound unnecessarily close to the same edge and, alternatively, at the opposite extreme position displaces the sealing compound towards the inside of the lid, where it is not useful.

All of this is made possible by an improved finish of the curling that always precedes the sealing compound lining and that, in the curved transition areas of the lid profile, is particularly noticeable as no sealing compound overflows and is spilled outside.

In addition to this improved finish, the final closure of the container is also facilitated by a later fine adjustment of the edge line of the lid or the base in its last turn in the core.

The new feeding device, with a single spindle attacking the base of the lid deposit, allows feeding to be performed continuously for all lids, without any stoppages, improving the depositing of the lid on the lid-bearing platen, which is performed gradually and without errors by first resting a long side of the lid on the protrusion of the lid bearing core, while the worm gear maintains the lid held on the opposite side and lets it enter this protrusion gradually by pulling on the edges of the core until the lid is fully inserted in the core, with the aid in the case of ferromagnetic lids of the magnetic field created inside the core, or alternatively, of the suction force exerted by conventional vacuum means in the case of aluminium and other non-ferromagnetic lids. In turn, and in order to prevent the lid from moving from its position with respect to the lid carrying platen in any case, a top ring can be provided to guide the top central part of the lid. This ring will have a break in the lid discharge and feed area.

After the lid has been deposited in the station the curling arm will approach, followed by the sealing compound lining arm, which had both retracted previously to discharge the lid, which lid has in turn completed the full revolution of 360° for curling and sealing compound lining in the machine. The arms are also retracted to prevent collisions with the feed tower.

The discharge device allows a synchronised exit of the lids and bases by having a conveyor belt provided with either a magnetic element of greater strength than that of the core, or a lid suction power greater than that of the vacuum that held it to the core, or a combination of the two depending on each case.

After this the lid falls on a miniature conveying system with two different speeds, with the belt speed faster than the synchronism chain speed. The latter has flanges so that when acting simultaneously they allow a continuous and synchronised conveying of the lids to the drying oven.

Finally, compared to conventional machines, most of which were designed for a single type of lid for each activity, curling or sealing compound lining, this machine in addition to curling and sealing compound lining simultaneously allows operating with any type of lid shape by simply resorting to an easy and quick exchange of the down-stacker, the lid-bearing platens and the copying cam, in the simplest and cheapest case of using a mechanical cam, while in the alternative case of using an electronic cam, when the user wishes to do so for whichever reason, such as when launching short series of different lid formats and wishing to minimise the time of replacing components, no mechanical device need be replaced as it is sufficient to reprogram the servomotors, allowing a simple adaptation to all lid shapes.

DESCRIPTION OF THE DRAWINGS

The present descriptive memory is accompanied by a set of drawings that illustrate a preferred and not limiting example of the invention.

PREFERRED EMBODIMENT OF THE INVENTION

Figure 1:
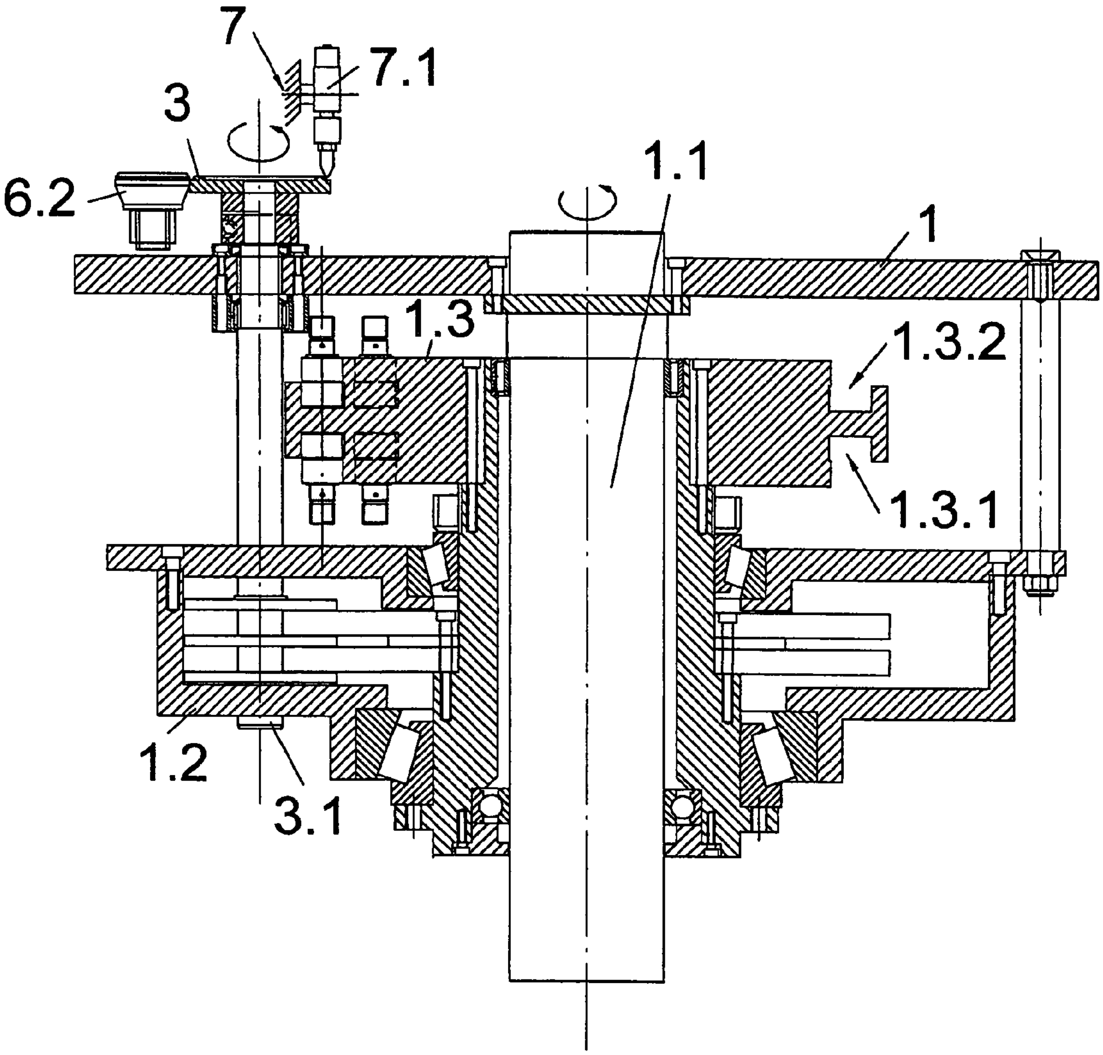
FIG. 1 is a diametrical cross-section of the main platen of the machine, showing both the turning mechanism and the cam for the two arms.
Figure 2:
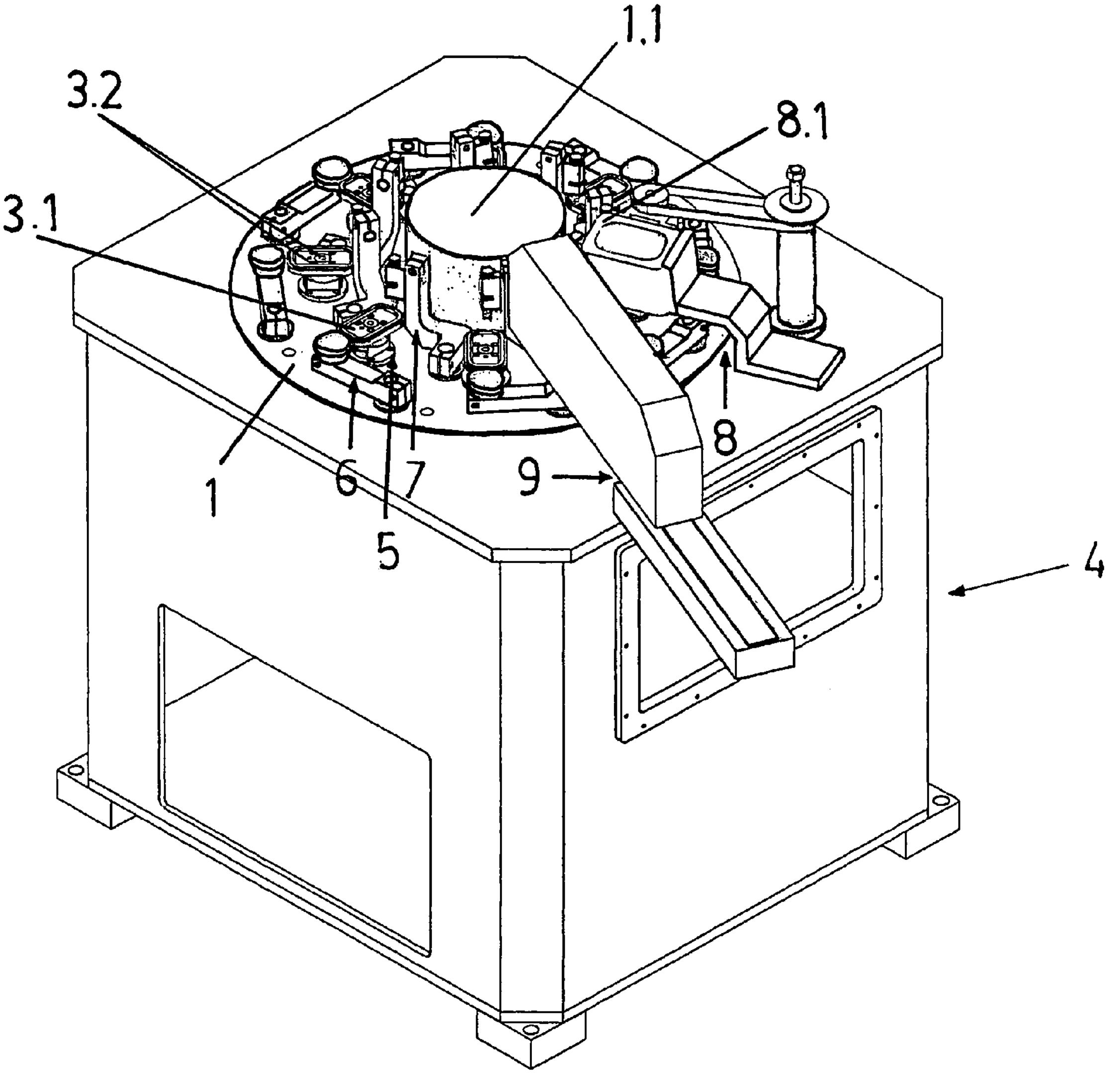
FIG. 2 is a perspective view of the curling-sealing compound lining machine of the invention according to the eight-stage embodiment of the preferred example.
Figure 3:
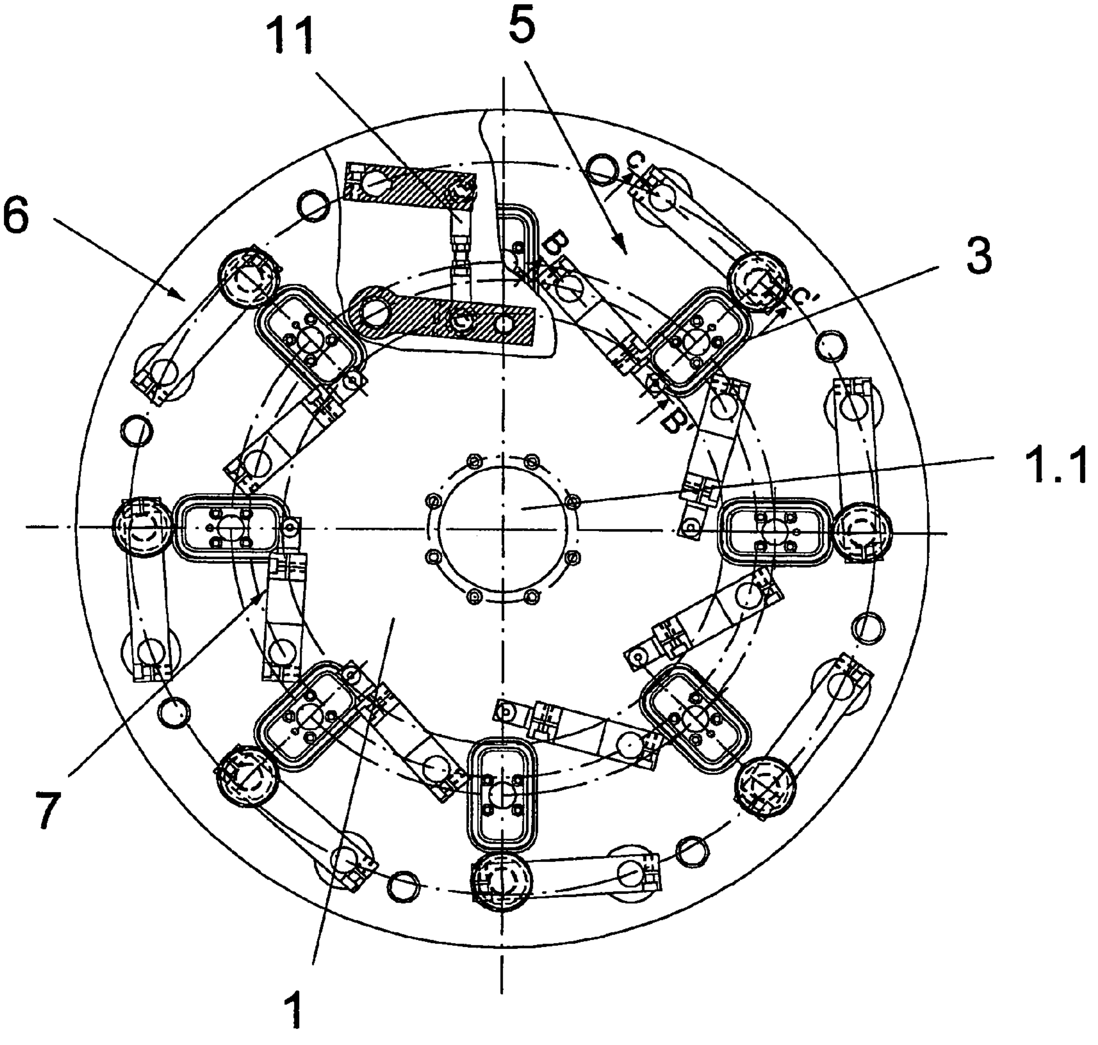
FIG. 3 is an upper plan view of the machine of the preferred example, with a partial cross section to show the mutual connections for actuation of the curling and sealing compound lining arms and the follower arm, as well as the lid feeding and discharge devices and the removed bases, in order to show more clearly the various workstations.
Figure 5:
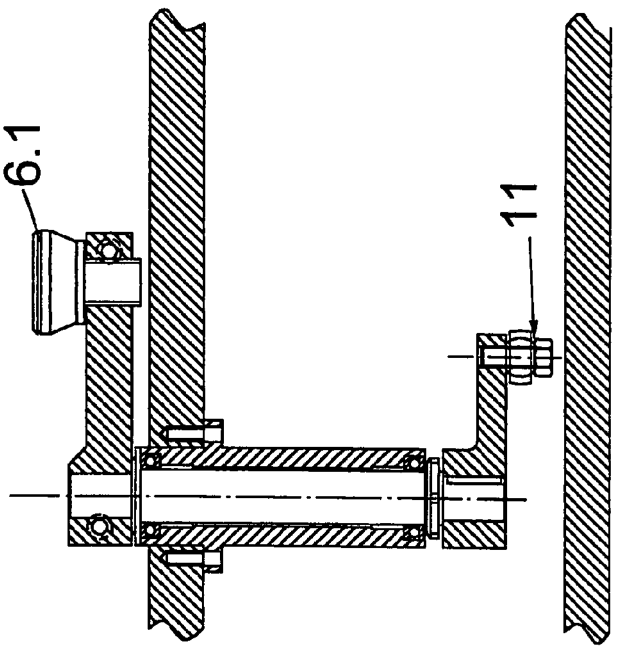
FIG. 5 is the curling device, showing the curling roller and the rod for connection to the copying arm that is part of the sealing compound lining device.
Figure 4:
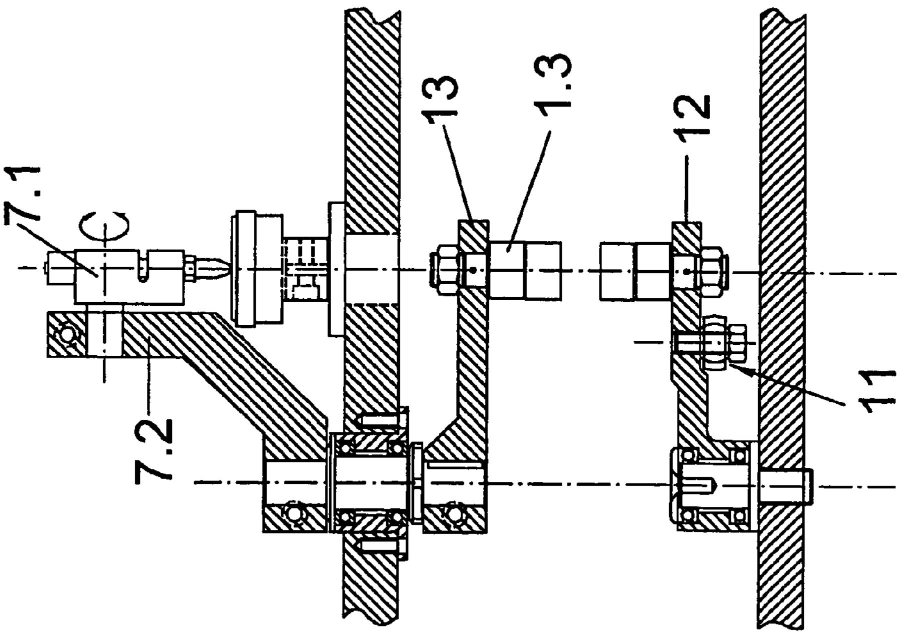
FIG. 4 is an enlarged view of a detail of the machine corresponding to the sealing compound lining device, in a cross section of an elevated view and showing the copying arms.
Figure 6:
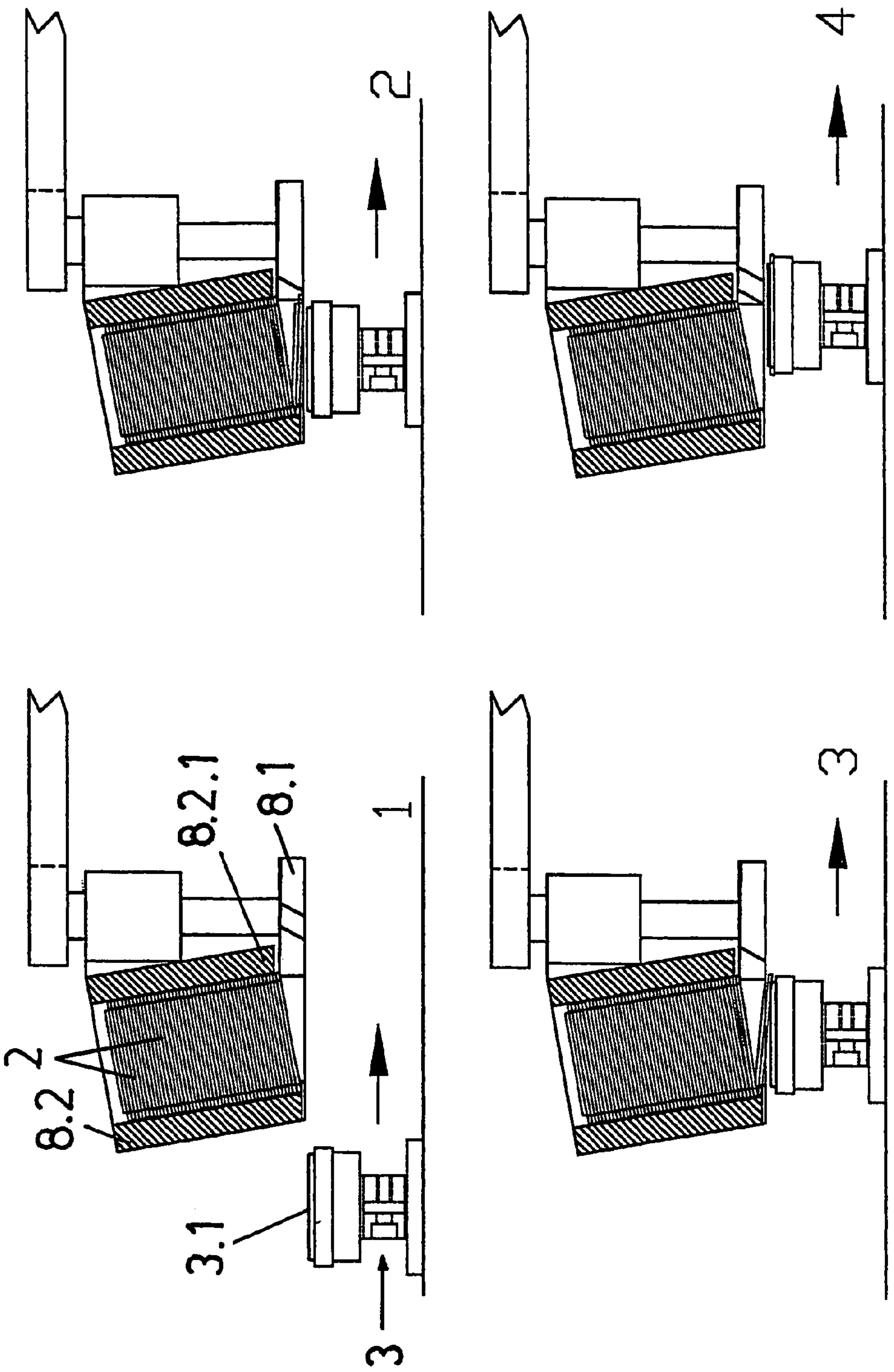
FIG. 6 is an enlargement of an elevation view of the feeding device for rectangular lids chosen as the preferred example, showing four consecutively numbered stages involved in depositing a lid on the lid carrier of a workstation.
Figure 7A:
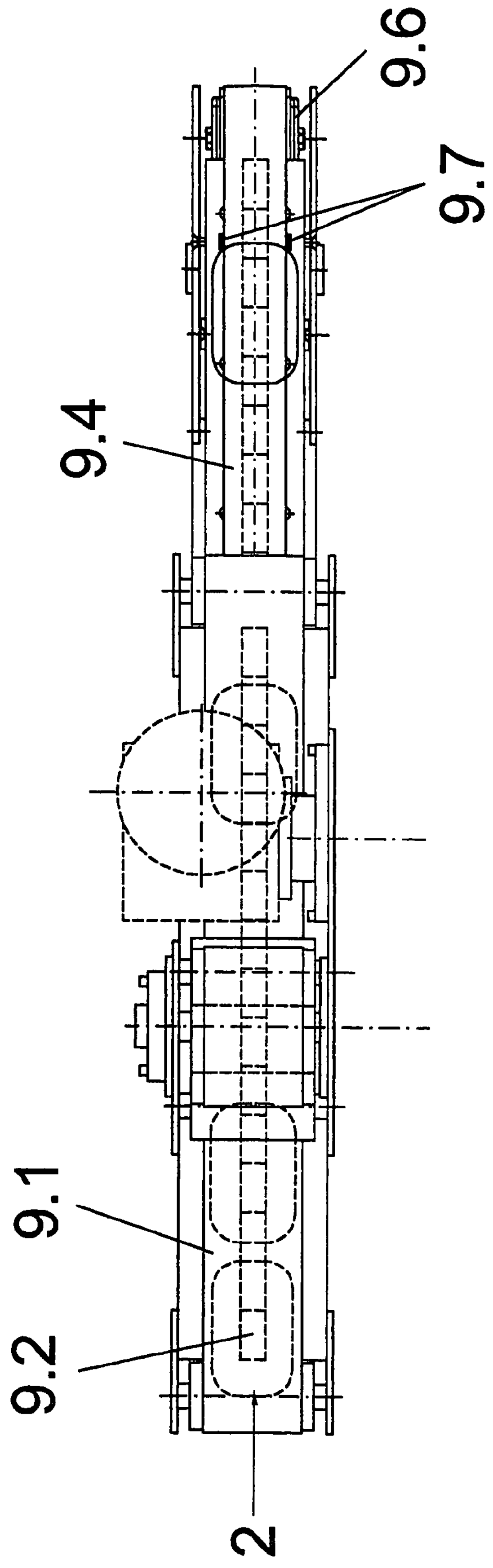
FIGS. 7*a* and 7*b* are respectively a plan and elevation schematic view of the lid discharge device placed on a section of the machine, showing the discharge synchronisation means.
Figure 7B:
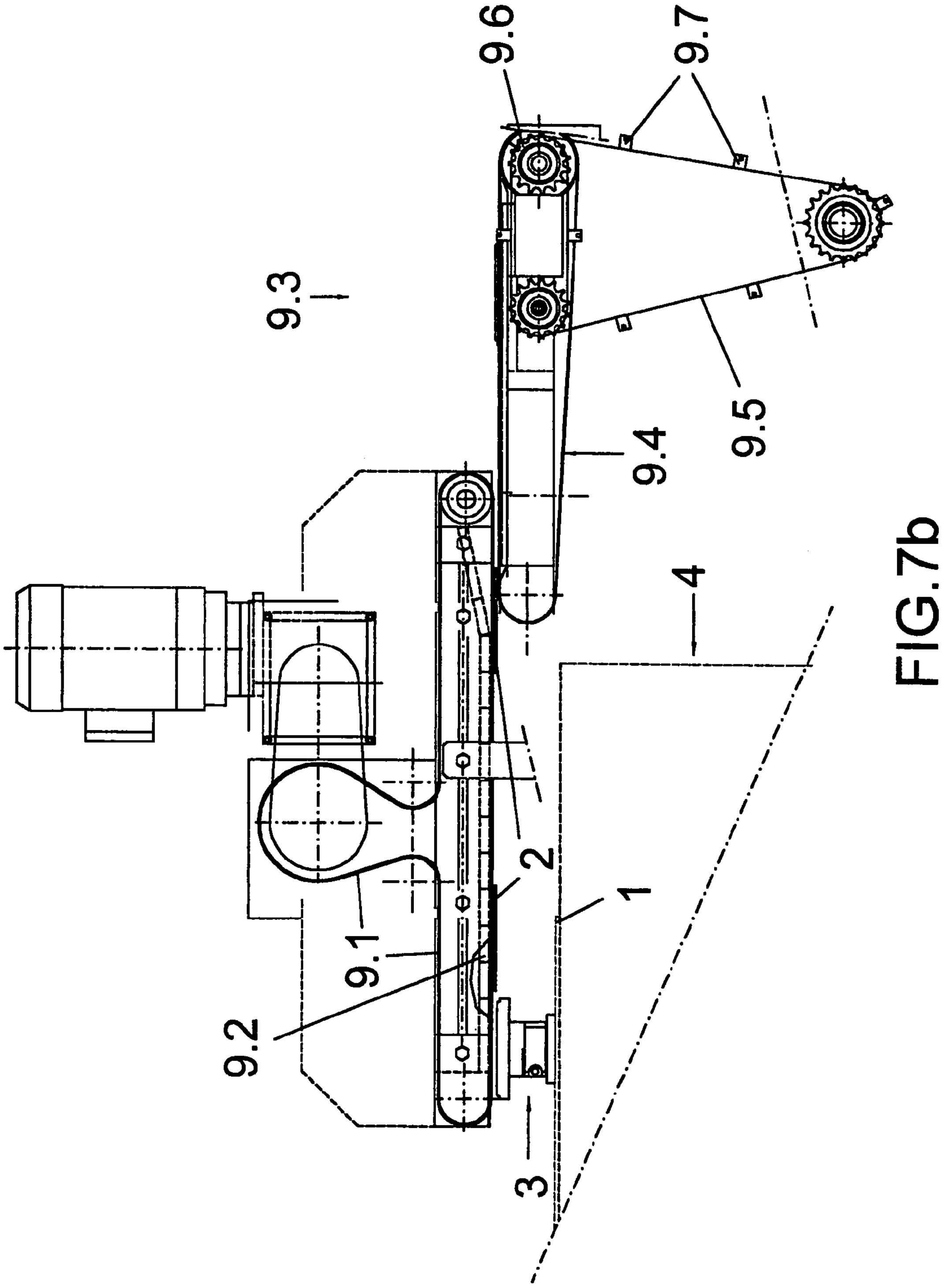
Figure 8:
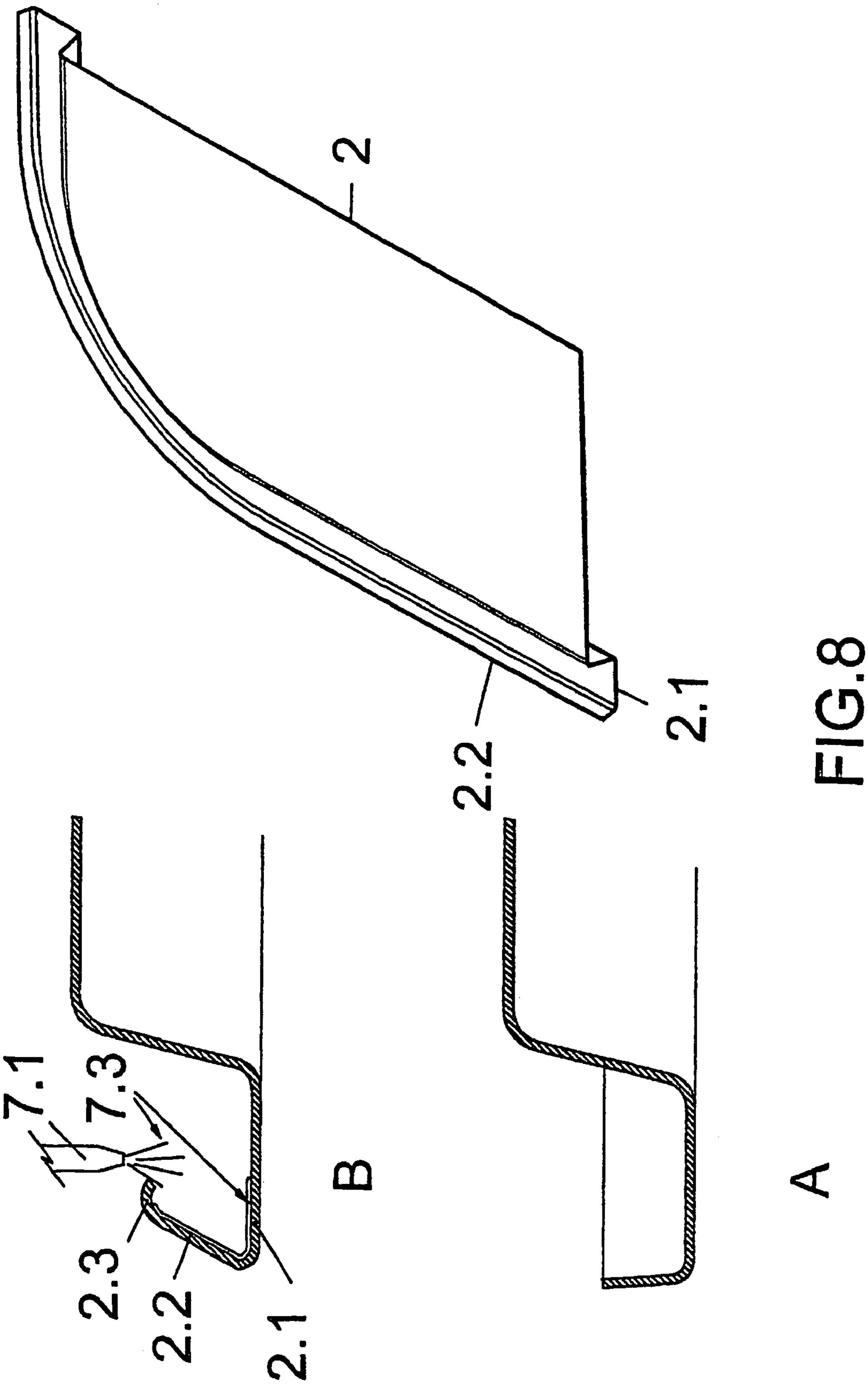
FIG. 8 shows two different consecutive details, before and after curling, of a perspective cross sectional view of any lid, whether rectangular, oval or triangular, with largely rounded edges, in which can be seen the arrangement of the sealing compound lining and the fine finish of the edge of the lid or base.

In view of the above, the present invention relates to a curling—sealing compound lining machine for non-circular container lids comprising a single unit, with a prismatic construction and a body provided with common driving means, as well as an upper base having a rotary platen (1), that in addition to performing both the curling and sealing compound lining operations simultaneously and at a high speed, allows operation with any type of profile of the lid (2) or base, adapting to any shape of these, for which is performed a simple and quick exchange of the lid-carrying platens (3), the copying cam (1.3) and the down-stacker (8.1); the machine (4) operates by rotating the lids among a number of workstations (5), preferably equidistant, provided with curling (6) and sealing compound lining (7) devices that are placed diametrically opposite each other in each station and are capable of moving from their usual working positions along an arc that matches the consecutive location of the feeding (8) and discharge (9) devices.

In this arc of the rotary platen (1) the lid (2) does not revolve at all, while in the arc remaining to complete the circle or to reach the following area of location of further feeding (8) and discharge (9) devices the lid (2) turns one or more full revolutions in each station (5) for curling and sealing compound lining, with the latter process preferably including a small overlap of the continuous sealing compound band (10).

In this preferred example with a single unit of feeding (8) and discharge (9) devices, the revolution-free arc of the lid-carrier is a 90° arc, with three full revolutions performed in the following 270°, in which already act the corresponding curling (6) and sealing compound lining (7) devices that act in this single set of devices, completing the operation with the lid (2).

The curling device (6) is provided with a curling roller (6.1) held by a rod (11) and attached to a follower arm (12) that follows the path of the bottom face (1.3.1) of the copying cam (1.3), with the cams remaining fixed in place and with the assembly formed by the platen (1) and the supporting arm (1.2) of the shafts (3.1) turning about it. Said support arm (1.2) of the shafts (3.1) is in charge of providing the rotation of the lid-carrying platen (3) about its shaft (3.1) by a conventional cam-follower system.

The sealing compound lining device (7) inclines the gun (7.1) with full accuracy, following the upper profile (1.3.2) of the copying cam (1.3) by means of the follower arm (13) in any angle desired with respect to the plane of attachment to the arm (7.2) set for each type of lid, and focusing the sealing compound stream (7.3) to the base (2.1) of the lid (2), and by centrifugal force to the inner face of the flange (2.2) and to a considerable extent of the inner rounded segment (2.3) of said face, as the curling precedes the sealing compound lining and there is no external overflow whatsoever of the sealing compound, with the final closure of the lid favoured by the fine adjustment of the edge line of the lid (2).

The feeding device (8) is provided with a single spindle (8.1) and deposits continuously the lids (2) without stops or errors, first holding a long side (2.1) of the bottom lid (2) of the lid deposit (8.2) in the core (3.1) of the lid carrier (3) and then gradually resting it on the core protrusion (3.1), with the lid held by the worm gear (8.1) and on its opposite side (2.2) by the deposit (8.2), which is suitably inclined for this purpose and also to facilitate the introduction of the spindle through the end of its uppermost base (8.2.1) until it is fully inserted in the core (3.1), in which operation participate, either alternatively or complementarily, magnets (3.2) inserted in the core (3.1) or conventional vacuum means.

Afterwards the curling device (6) approaches first, and after it the sealing compound lining device (7), which had been retracted earlier by the discharge device (9) of the last finished lid (2) in order to free space for passage of the feeding tower (8.2).

The discharge device (9) is provided with a conveyor belt (9.1) having a magnetic element (9.2), that is more powerful than the magnets (3.2) of the core (3.1), and/or vacuum means that are stronger than the vacuum used to hold the lid (2) in its circular path, such that latter may remain or be eliminated when not required, then stopping the action of either of the means for absorbing the lid (2), which will fall on a mini-conveyor (9.3) provided with a belt (9.4) and a synchronism chain (9.5) that move at different speeds as they are arranged with different diameters of the main pinion (9.6), with that of the belt (9.4) greater than that of the chain (9.5), and the latter having flanges (9.7) for holding the extracted lid (2), synchronising the continuous conveying of the lids (2) to the drying oven.

Complementarily it is possible to install a top guide ring for the upper central part of the lid (2) that will be open at the segment of the platen (1) located between lid discharge and feeding.

The machine (4) may incorporate different numbers of workstations (5) in either odd or even numbers if, in order to optimise the ratio between the revolutions of the platen (1) and the revolutions of the lid-carrying platens (3) it is preferable to have machines with 4, 6, 8, 10 or 12 workstations (5), although greater numbers are not advisable as the size of the machine would interfere with the production line.

When more than one set of feeding (8) and discharge (9) devices is provided in the machine, an equal number of revolution-free arcs of the lid carrier (3) are installed with a coverage angle appropriate for the stations (5), so that the two are separated and arranged according to the corresponding revolution sector, while the curling and sealing compound lining devices (6) and (7) that operate with each set of arcs complete their action with the lid (2) before arriving at the following arc, that begins at the location of the new discharge device (9) of the curled and sealing-compound lined lid (2) and ends at the feeding device (8) that initiates the following operation on the lid (2).

In the case of machines (4) with an even number of stations (5) the feeding and discharge devices (8) and (9) can be arranged in double sets, so that a set of feeding and discharge devices (8) and (9) acts with even positions of the stations (5) and another set accts with the odd positions. These odd or even positions can incorporate lids (2) that are identical or different from each other.

When an electronic cam is provided it is sufficient to reprogram the servomotor assembly and to simply replace the down-stacker (8.1) and the lid-carrying platens (3), thus not having to replace the two internal mechanical devices, the lid-carrying platens (3) and the copying cam (1.3), as it is sufficient to reprogram the servomotor assembly.

Thus, the curling and sealing compound lining operations in the corresponding arc and with the appropriate number of revolutions, depending on the curling and sealing compound lining arcs and the stoppage arcs, as designed for each case, can be effected by a specific design of the copying cam (1.3) and the support arm (1.2) of the shafts (3.1) or, when implementing an electronic cam, by reprogramming the servomotor assembly.

Lastly, in industries requiring curling units the high productivity and low cost of this machine as compared to market-available sealing compound liners allows its application exclusively for sealing compound lining operations, for which it is only necessary to remove the curling devices (6), the rod (11) and the follower arm (12) from the various stations (5).

The essence of this invention is not affected by changes in the shape, size and arrangement of the component elements, which are described in a non-limiting manner that should allow its reproduction by an expert.

The invention claimed is:

1. A curling-sealing compound lining machine for non-circular metal lids of containers, characterized by a continuous operation and comprising a single body with a prismatic construction and a body provided with:

an upper base incorporating a large rotary platen (1);

a number of workstations (5), placed on the platen (1) and provided with curling (6) and sealing compound lining (7) devices placed diametrically opposite each other in each station (5);

one or several sets of feeding devices (8) and discharge devices (9), placed consecutively in the appropriate order on the platen (1); common actuation means for these stations (5) inside the machine (4); such that:

the rotary platen (1), in addition to performing both the curling and sealing compound lining operations continuously and at a high speed, allows working with any type of profile of lid (2) or base, adapting to any shape, by rotating the lids (2) in the workstations (5) while stationed on top of a lid-carrying platen (3);

the curling (6) and sealing compound lining (7) devices can move from their usual working positions along the arc on which are placed the feeding (8) and discharge (9) devices, that also operate continuously.

2. A curling-sealing compound lining machine for non-circular metal lids of containers, according to claim 1, characterized in that in the arc of the rotary platen (1) occupied by each set of feeding (8) and discharge (9) devices no rotation takes place of the lid (2), while in the arc remaining to complete the circle one or more full revolutions of the lid (2) take place in each station (5) for curling and sealing compound lining, the latter operation involving a small overlap (10.1) of a band (10) of the continuous sealing compound.

3. A curling-sealing compound lining machine for non-circular metal lids of containers, according to claim 2, characterized in that when more than one set of feeding (8) and discharge (9) devices are provided they are separated and arranged according to a corresponding rotation sector, while the curling and sealing compound lining (7) devices that act with each set of the aforementioned devices complete their action on the lid (2) before reaching the following arc, which begins at the location of the new discharge device (9) of the curled and sealing compound lined lid (2) and ends at the corresponding feeding device (8) that signals the start of the following operation on the lid (2).

4. A curling-sealing compound lining machine for non-circular metal lids of containers, according to claim 2, characterized in that in each set of feeding (8) and discharge (9) devices the revolution-free arc of the lid-carrier is a 90° arc, with three full revolutions performed in the following 270° in which already act the corresponding curling (6) and sealing compound lining (7) devices.

5. A curling-sealing compound lining machine for non-circular metal lids of containers, according to claim 4, characterized in that during these three revolutions a curling operation and a sealing compound lining operation take place that are practically simultaneous, although the curling operation occurs slightly earlier, with the third revolution effected for the curling device (6) meant for a fine adjustment or calibration of an edge (2.3) of a flange (2.2) of an end segment of the lid (2).

6. A curling-sealing compound lining machine for non-circular metal lids of containers, according to claim 4, characterized in that the curling and sealing compound lining operations in the corresponding arc and with the appropriate number of revolutions are performed either with a specific design of a cam-follower device or with an electronic cam system incorporating a programmable servomotor.

7. A curling-sealing compound lining machine for non-circular metal lids of containers, according to claim 4, characterized in that the revolutions of the lid carrier (3) in its corresponding arc can be varied by whole numbers, and with them the actions of the curling (6) and sealing compound lining (7) devices.

8. A curling-sealing compound lining machine for non-circular metal lids of containers, according to claim 7, characterized in that the number of actions of the curling and sealing compound lining (7) devices are identical in each corresponding arc.

9. A curling-sealing compound lining machine for non-circular metal lids of containers, according to claim 1, characterized in that the curling device (6) is provided with a roller (6.1) held by a rod (11) and attached to a follower arm (12) that follows the path of a bottom face (1.3.1) of a copying cam (1.3), located below the rotary platen, with the cams remaining fixed in place so that it is the assembly formed by the platen (1) and a supporting arm (1.2) and shafts (3.1) that revolves; said supporting arm (1.2) and shafts (3.1) are in turn in charge of providing the rotation of the lid-carrying platen (3) about its shaft (3.1) by a conventional cam-follower system.

10. A curling-sealing compound lining machine for non-circular metal lids of containers, according to claim 9, characterized in that the sealing compound lining device (7), comprising a gun (7.1) held by an arm (7.2) attached to a follower arm (13), inclines the gun (7.1) with full accuracy, following an upper profile (1.3.2) of the copying cam (1.3) by means of the follower arm (13) in any angle desired with respect to the plane of attachment to the arm (7.2) set for each type of lid, focusing a sealing compound stream (7.3), produced by the gun (7.1), to the base (2.1) of the lid (2) and by centrifugal force to the inner face of a lid flange (2.2) as well as to a considerable area of an inner rounded segment (2.3) of said face, as the curling precedes the sealing compound lining and there is no external overflow whatsoever of the sealing compound, with the final closure of the lid favored by the fine adjustment of the edge line of the lid (2).

11. A curling-sealing compound lining machine for non-circular metal lids of containers, according to claim 9, characterized in that the curling action may be eliminated by removing the curling devices (6), the rods (11) and the follower arms (12) from the various stations (5) of the machine (4).

12. A curling-sealing compound lining machine for non-circular metal lids of containers, according to claim 9, characterized in that the feeding device (8), comprising a lid deposit (8.2) and a single down stacker (8.1), which deposits continuously the lids (2) without stops or errors, firstly holding a long side (2.1) of the bottom lid (2) of the lid deposit (8.2) on a core (3.1) of the lid carrier (3) and then gradually resting it on the core protrusion (3.1), with the lid held by the down stacker (8.1) and on its opposite side (2.2) by the deposit (8.2), which is suitably inclined for this purpose and to facilitate the introduction of the down stacker through the end of the deposit's uppermost base (8.2.1) until the lid is fully inserted in the core (3.1), in which operation participate, either alternatively or complementarily, magnets (3.2) inserted in the core (3.1) or conventional vacuum means.

13. A curling-sealing compound lining machine for non-circular metal lids of containers, according to claim 12, characterized in that the curling device (6) approaches first, and thereafter the sealing compound lining device (7), both of which had been retracted earlier by the discharge device (9) of the last finished lid (2) in order to free space for passage of the lid deposit (8.2).

14. A curling-sealing compound lining machine for non-circular metal lids of containers, according to claim 12, characterized in that the discharge device (9) is provided with a conveyor belt (9.1) having a magnetic element (9.2), that is more powerful than the magnets (3.2) of the core (3.1), and/or suction means that are stronger than the vacuum used to hold the lid (2) in the core, such that the vacuum may remain or be eliminated when not required, then stopping the action of the magnetic element or the suction means, which lid will then fall on a mini-conveyor (9.3) provided with a belt (9.4), a main pinion (9.6), flanges (9.7), and a synchronism chain (9.5) that move at different speeds as they are arranged with different diameters of the main pinion (9.6), with that of the belt (9.4) being greater than that of the chain (9.5), and with the latter having flanges (9.7) for holding the extracted lid (2), synchronizing the continuous conveying of the lids (2) to a drying oven.

15. A curling-sealing compound lining machine for non-circular metal lids of containers, according to claim 12, characterized in that the machine (4) adapts to any shape of the lids (2) by a simple and quick replacement of the lid-carrying platens (3), the copying cam (1.3) and the down-stacker (8.1).

16. A curling-sealing compound lining machine for non-circular metal lids of containers, according to claim 15, characterized in that as an alternative the machine (4) incorporates an electronic cam system, avoiding the need to replace the lid-carrying platens and the copying cam (1.3), only requiring to reprogram a servomotor assembly of the electronic cam system and to perform a simple replacement of the down-stacker (8.1) and the lid-carrying platens (3).

17. A curling-sealing compound lining machine for non-circular metal lids of containers, according to claim 1, characterized in that a top guide ring for an upper central part of the lid (2) is installed complementarily, said ring being open at a segment of the platen (1) located between lid discharge and feeding of the lids (2).

18. A curling-sealing compound lining machine for non-circular metal lids of containers, according to claim 1, characterized in that the machine (4) incorporates 4–12 workstations (5) in either odd or even number in order to optimize the ratio between the revolutions of the platen (1) and the revolutions of the lid-carrying platens (3).

* * * * *